United States Patent
Gilmour et al.

(10) Patent No.: US 10,917,565 B1
(45) Date of Patent: Feb. 9, 2021

(54) IMAGE CAPTURE DEVICE WITH A SPHERICAL CAPTURE MODE AND A NON-SPHERICAL CAPTURE MODE

(71) Applicant: GoPro, Inc., San Mateo, CA (US)

(72) Inventors: Nicholas Ryan Gilmour, San Jose, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 19 days.

(21) Appl. No.: 16/296,610

(22) Filed: Mar. 8, 2019

(51) Int. Cl.
*H04N 5/232* (2006.01)
*H04N 13/239* (2018.01)
*H04N 13/106* (2018.01)
*G03B 37/04* (2021.01)
*G06F 9/30* (2018.01)

(52) U.S. Cl.
CPC ......... *H04N 5/23238* (2013.01); *G03B 37/04* (2013.01); *G06F 9/30003* (2013.01); *H04N 13/106* (2018.05); *H04N 13/239* (2018.05)

(58) Field of Classification Search
CPC ............. H04N 5/23238; H04N 13/106; H04N 13/239; G03B 37/04; G06F 9/30003
See application file for complete search history.

(56) References Cited

U.S. PATENT DOCUMENTS

| | | | |
|---|---|---|---|
| 2012/0162357 A1* | 6/2012 | Okegawa | H04N 5/23238 348/36 |
| 2012/0206565 A1* | 8/2012 | Villmer | H04N 5/23258 348/36 |
| 2013/0242040 A1* | 9/2013 | Masuda | G02B 13/06 348/36 |
| 2016/0234438 A1* | 8/2016 | Satoh | G06T 5/006 |
| 2018/0144520 A1* | 5/2018 | Forutanpour | G06F 3/013 |
| 2020/0280679 A1* | 9/2020 | Kuribayashi | H04N 5/23222 |

* cited by examiner

*Primary Examiner* — Maria E Vazquez Colon
(74) *Attorney, Agent, or Firm* — Esplin & Associates, PC

(57) ABSTRACT

An image capture device may switch operation between a spherical capture mode or a non-spherical capture mode. Operation of the image capture device in the spherical capture mode includes generation of spherical visual content based on the visual content generated by multiple image sensors. Operation of the image capture device in the non-spherical capture mode includes generation of non-spherical visual content based on visual content generated by a single image sensor.

20 Claims, 13 Drawing Sheets

IMAGE CAPTURE DEVICE WITH A SPHERICAL CAPTURE MODE AND A NON-SPHERICAL CAPTURE MODE

FIELD

This disclosure relates to an image capture device with a spherical capture mode and a non-spherical capture mode.

BACKGROUND

A spherical camera may include multiple image sensors to capture 360-degree scene around the camera. Images captured by different image sensors may be stitched together to generate a spherical video. A user using a spherical camera may not wish to capture a spherical video.

SUMMARY

This disclosure relates to an image capture device with a spherical capture mode and a non-spherical capture mode. An image capture device may include a housing. The housing may carry one or more of a first image sensor, a second image sensor, a first optical element, a second optical element, a processor, an electronic storage, and/or other components. The first image sensor may generate a first output signal conveying first visual information defining first visual content based on light guided thereto by the first optical element, and the second image sensor may generate a second output signal conveying second visual information defining second visual content based on light guided thereto by the second optical element. The processor(s) may be configured to operate the image capture device in a spherical capture mode or a non-spherical capture mode. Operation of the image capture device in the spherical capture mode may include generation of spherical visual content based on the first visual content and the second visual content. Operation of the image capture device in the non-spherical capture mode may include generation of non-spherical visual content based on the first visual content or the second visual content.

An electronic storage may store visual information defining visual content, information relating to visual content, spherical visual information defining spherical visual content, information relating to spherical visual content, non-spherical visual information defining non-spherical visual content, information relating to non-spherical visual content, information relating to operation of the image capture device, information relating to the spherical capture mode, information relating to the non-spherical capture mode, and/or other information. Visual content may refer to content of one or more images and/or one or more videos that may be consumed visually. For example, visual content may be defined within one or more images and/or one or more video frames of a video. Visual content may be stored in one or more formats and/or one or more containers.

The housing may carry one or more components of the image capture device. The housing may carry (be attached to, support, hold, and/or otherwise carry) one or more of a first image sensor, a second image sensor, a first optical element, a second optical element, a processor, an electronic storage, and/or other components.

The first image sensor may be configured to generate a first output signal and/or other output signals. The first output signal may convey first visual information based on light that becomes incident thereon and/or other information. The first visual information may define first visual content. The second image sensor may be configured to generate a second output signal and/or other output signals. The second output signal may convey second visual information based on light that becomes incident thereon and/or other information. The second visual information may define second visual content.

The first optical element may be configured to guide light within a first field of view to the first image sensor. The first field of view may be greater than 180 degrees. The second optical element may be configured to guide light within a second field of view to the second image sensor. The second field of view may be greater than 180 degrees.

The second optical element may be carried by the housing such that a peripheral portion of the first field of view and a peripheral portion of the second field of view overlap. The overlap of the peripheral portion of the first field of view and the peripheral portion of the second field of view may enable spherical capture of visual content based on the first visual content and the second visual content.

The processor(s) may be configured by machine-readable instructions. Executing the machine-readable instructions may cause the processor(s) to facilitate operation of the image capture device. The machine-readable instructions may include one or more computer program components. The computer program components may include one or more of a spherical mode component, a non-spherical mode component, a switch component, and/or other computer program components.

The spherical mode component may be configured to operate the image capture device in the spherical capture mode. An operation of the image capture device in the spherical capture mode may include generation of spherical visual content based on the first visual content, the second visual content, and/or other visual content.

The non-spherical mode component may be configured to operate the image capture device in the non-spherical capture mode. An operation of the image capture device in the non-spherical capture mode may include generation of non-spherical visual content based on the first visual content and/or other visual content.

The switch component may be configured to switch the operation of the image capture device between the spherical capture mode and the non-spherical capture mode.

In some implementations, the operation of the image capture device in the non-spherical capture mode may further include inclusion of an extent of the first visual content within the non-spherical visual content. The extent of the first visual content may be determined based on a gaze of a user within the second visual content.

In some implementations, the operation of the image capture device in the non-spherical capture mode may further include change in a focus of the image capture device for the generation of non-spherical visual content. The focus of the image capture device may be changed based on a gaze of a user within the second visual content.

In some implementations, the operation of the image capture device in the non-spherical capture mode may further include combination of a portion of the first visual content and a portion of the second visual content within the non-spherical visual content. The portion of the first visual content and the portion of the second visual content may be time-synchronized based on operation of the first image sensor and the second image sensor by the image capture device.

In some implementations, the portion of the first visual content and the portion of the second visual content may be spatially arranged within the non-spherical visual content for simultaneous presentation.

In some implementations, the portion of the first visual content and the portion of the second visual content may be temporally arranged within the non-spherical visual content for sequential presentation.

In some implementations, the portion of the first visual content and the portion of the second visual content may be temporally arranged for sequential presentation based on audio associated with the second visual content. The portion of the first visual content and the portion of the second visual content may be temporally arranged for sequential presentation based on identification of first depiction of interest within the portion of the first visual content and second depiction of interest within the portion of the second visual content.

In some implementations, the sequential presentation of the portion of the first visual content and the portion of the second visual content may include a panning transition from the first depiction of interest within the first visual content to the second depiction of interest within the second visual content. The panning transition from the first depiction of interest within the first visual content to the second depiction of interest within the second visual content may include stitching of the first visual content and the second visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
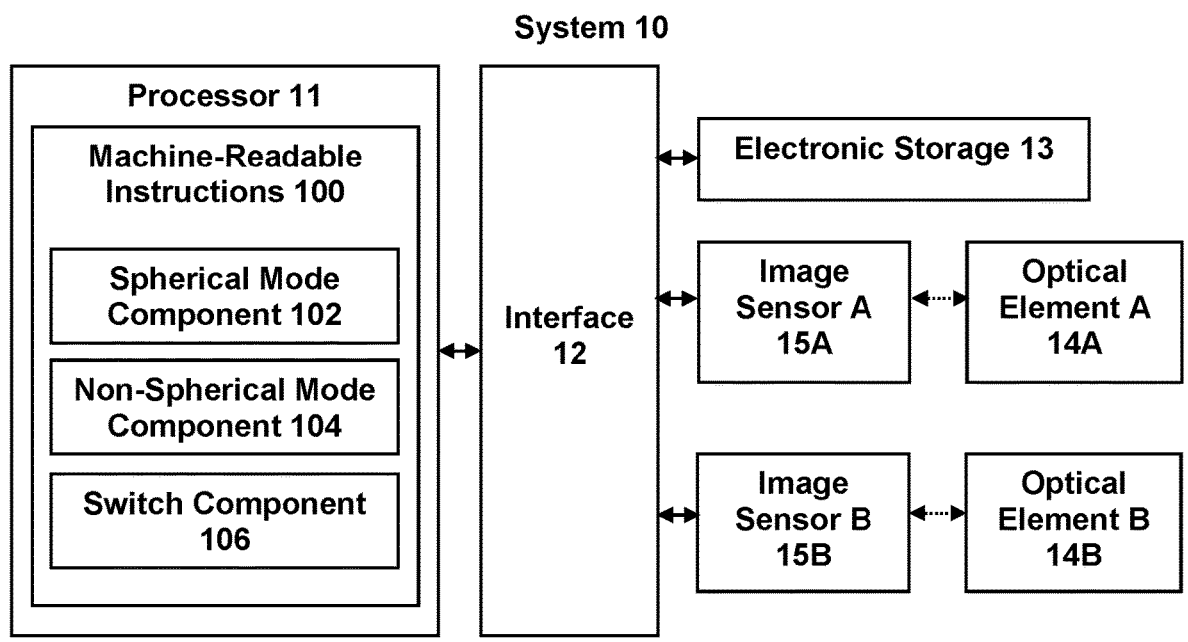
FIG. 1 illustrates a system that operates an image capture device with a spherical capture mode and a non-spherical capture mode.

FIG. 1 illustrates a system 10 for operating an image capture device with a spherical capture mode and a non-spherical capture mode. The system 10 may include or be part of an image capture device. The system 10 may include one or more of a processor 11, an interface 12 (e.g., bus, wireless interface), an electronic storage 13, an optical element A 14B, an optical element B 14B, an image sensor A 15A, and image sensor B 15B, and/or other components. One or more components of the system 10 may be carried by a housing of the image capture device. The image sensor A 15A may generate a first output signal conveying first visual information defining first visual content based on light guided thereto by the optical element A 14A, and the image sensor B 15B may generate a second output signal conveying second visual information defining second visual content based on light guided thereto by the optical element B 14B. The processor 11 may be configured to operate the image capture device in a spherical capture mode or a non-spherical capture mode. Operation of the image capture device in the spherical capture mode may include generation of spherical visual content based on the first visual content and the second visual content. Operation of the image capture device in the non-spherical capture mode may include generation of non-spherical visual content based on the first visual content or the second visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, spherical visual information defining spherical visual content, information relating to spherical visual content, non-spherical visual information defining non-spherical visual content, information relating to non-spherical visual content, information relating to operation of the image capture device, information relating to the spherical capture mode, information relating to the non-spherical capture mode, and/or other information.

Visual content may refer to content of one or more images and/or one or more videos that may be consumed visually. For example, visual content may be defined within one or more images and/or one or more video frames of a video. For instance, video frame(s) of a video may define the visual content of the video. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture). Partial spherical visual content may be referred to as panoramic visual content.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

Video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content are contemplated.

Figure 3:
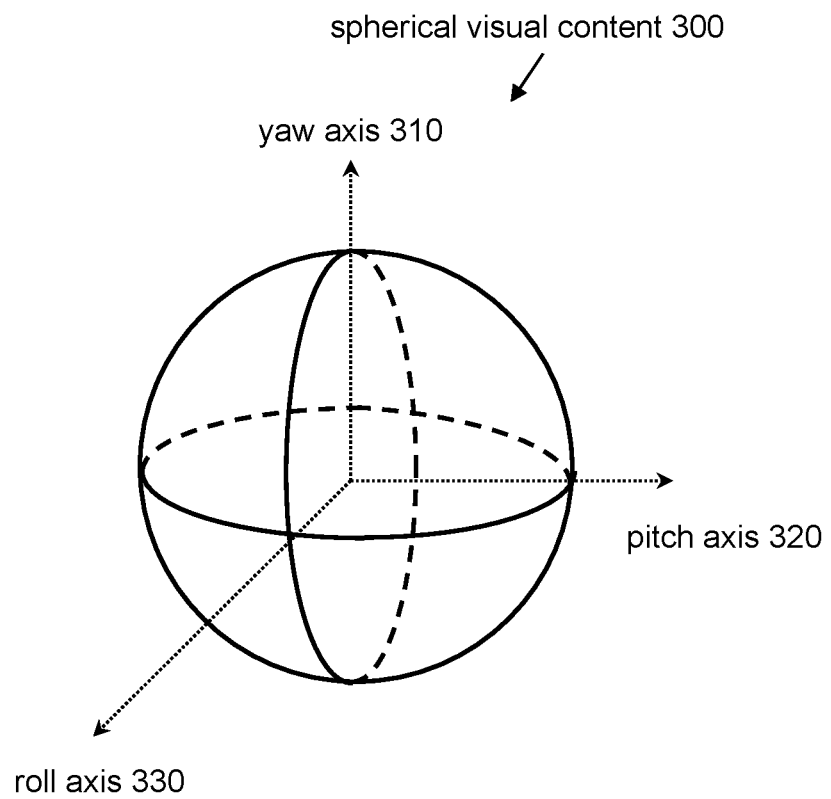
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
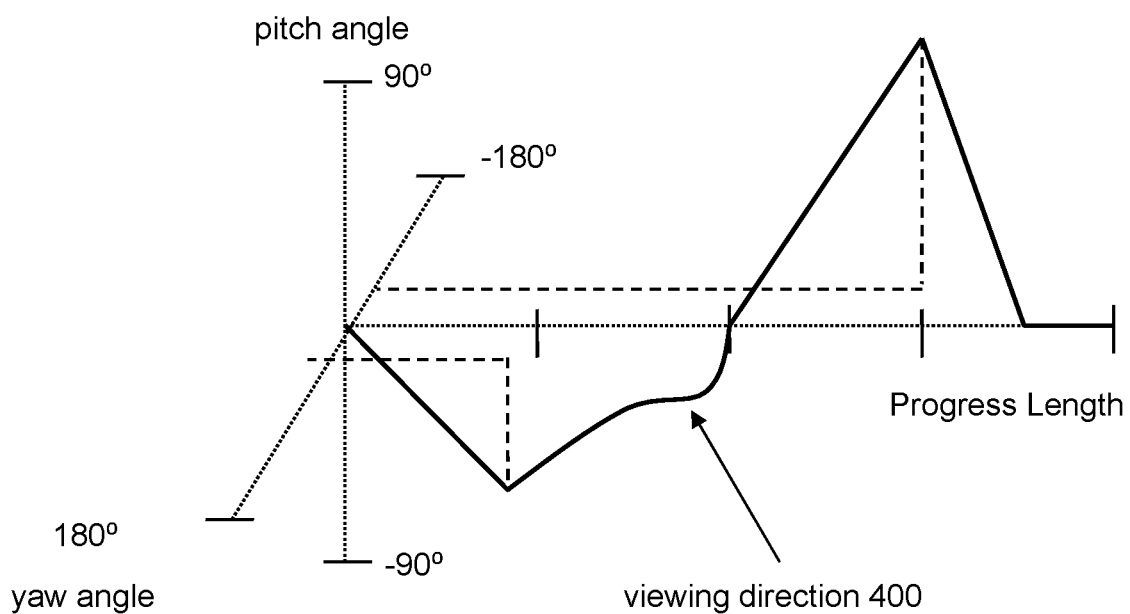
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figures 5A, 5B:
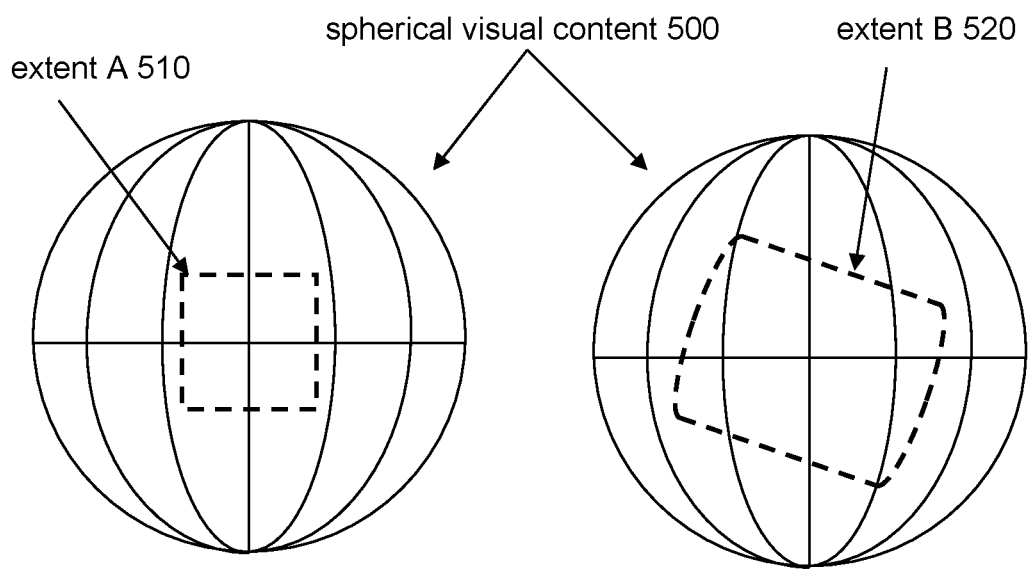
FIGS. 5A-5B illustrate example extents of spherical visual content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

Figure 6:
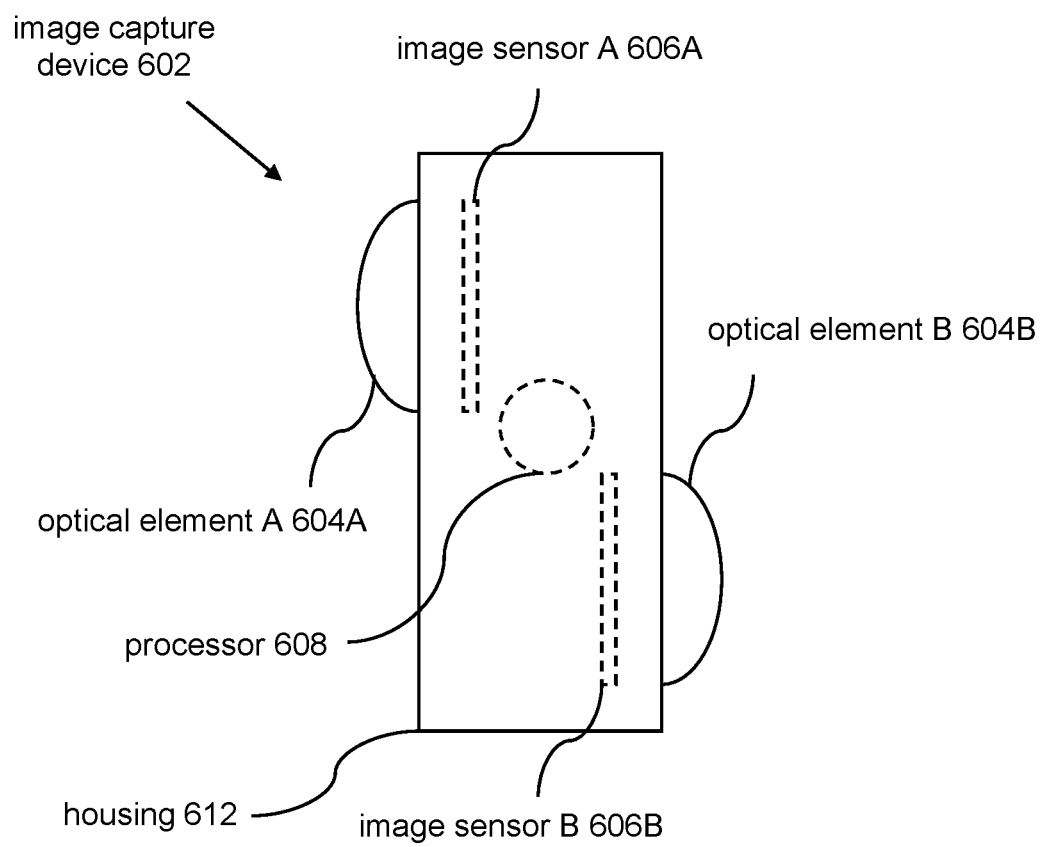
FIG. 6 illustrates an example image capture device.

An image capture device may refer to a device captures visual content. An image capture device may capture visual content in form of images, videos, and/or other forms. For example, an image capture device may refer to a camera and/or an image sensor. FIG. 6 illustrates an example image capture device 602. Visual content may be captured by the image capture device 602. The image capture device 602 may include a housing 612, and the housing 612 may carry (be attached to, support, hold, and/or otherwise carry) one or more of an optical element A 604A, an optical element B 604B, an image sensor A 606A, an image sensor B 606B, a processor 608, and/or other components. Other configurations of image capture devices are contemplated.

One or more components of the image capture device 602 may be the same as, be similar to, and/or correspond to one or more components of the system 10. For example, the optical elements 604, 604B may be the same as, be similar to, and/or correspond to the optical elements 14A, 14B. The image sensors 606A, 660B may be the same as, be similar to, and/or correspond to the image sensors 15A, 15B. The processor 608 may be the same as, be similar to, and/or correspond to the processor 11.

The optical elements 604A, 604B may include instrument(s), tool(s), and/or medium that acts upon light passing through the instrument(s)/tool(s)/medium. For example, the optical elements 604A, 604B may include one or more of lens, mirror, prism, and/or other optical elements. The optical elements 604A, 604B may affect direction, deviation, and/or path of the light passing through the optical elements 604A, 604B. While the optical elements 604A, 604B are shown in a staggered configuration, this is merely an example. In some implementations, the optical elements 604A, 604B The image sensors 606A, 606B may include sensor(s) that converts received light into output (electrical) signals. The image sensors 606A, 606B may generate output signals conveying information that defines visual content of one or more images and/or one or more video frames of a video. For example, the image sensors 606A, 606B may include one or more of a charge-coupled device sensor, an active pixel sensor, a complementary metal-oxide semiconductor sensor, an N-type metal-oxide-semiconductor sensor, and/or other image sensors.

The image sensors 606A, 606B may be configured to generate output signals conveying visual information (defining visual content of images and/or videos) based on light that becomes incident thereon and/or other information. The optical element A 604A may be configured to guide light within a field of view to the image sensor A 606A, and the image sensor A 606A may be configured to generate output signals conveying visual information based on light that becomes incident thereon via the optical element A 604A. The optical element B 604B may be configured to guide light within a field of view to the image sensor B 606B, and the image sensor B 606B may be configured to generate output signals conveying visual information based on light that becomes incident thereon via the optical element B 604B. The fields of view of the optical elements 604A, 604B may refer to the extents of the observable world that is seen through the optical elements 604A, 604B. The field of views of the optical elements 604A, 604B may include one or more angles (e.g., vertical angle, horizontal angle, diagonal angle) at which light is received and passed on by the optical elements 604A, 604B. The fields of view of the optical elements 604A, 604B may be the same or different.

The fields of view of the optical elements 604A, 604B may be greater than or equal to 180-degrees. The optical elements 604A, 604B may be carried by the housing 312 such that peripheral portions of the fields of view of the optical elements 604A, 604B overlap. The overlap of the peripheral portions of the fields of view of the optical elements 604A, 604B may enable capture of spherical visual content (e.g., of images and/or videos) based on the visual information conveyed by the output signals of the image sensors 606A, 606B. That is, the overlap of the peripheral portions of the fields of view of the optical elements 604A, 604B may enable capture of spherical visual content based on visual content defined by the visual information of the image sensor A 606A (visual content captured by the image sensor A 606A) and visual content defined by the visual information of the image sensor B 606B (visual content captured by the image sensor B 606B).

The processor 608 may include one or more processors (logic circuitry) that provide information processing capabilities in the image capture device 602. The processor 608 may provide one or more computing functions for the image capture device 602. The processor 608 may operate/send command signals to one or more components of the image capture device 602 to operate the image capture device 602. For example, the processor 608 may facilitate operation of the image capture device 602 in capturing image(s) and/or video(s), facilitate operation of the optical elements 604A, 604B (e.g., change how light is guided by the optical elements 604A, 604B), and/or facilitate operation of the image sensors 606A, 606B (e.g., change how the received light is converted into information that defines images/videos and/or how the images/videos are post-processed after capture). The processor 608 may include and/or perform one or more functionalities of the processor 11 shown in FIG. 1.

The image capture device 602 may include other sensors, such as one or more motion sensors. A motion sensor may refer to one or more sensors that converts experienced motions into output signals. The output signals may include electrical signals. A motion sensor may generate output signals conveying information that characterizes motions and/or positions of the motion sensor and/or device(s) carrying the motion sensor, such as the image capture device 602. The motions/positions characterized by a motion sensor may include translational motions/positions and/or rotational motions/positions. For example, a motion sensor may refer to a set of motion sensors, which may include one or more inertial measurement units, one or more accelerometers, one or more gyroscopes, and/or other motion sensors.

The image capture device 602 may be configured to operate in and switch between a spherical capture mode, a non-spherical capture mode, and/or other modes. For instance, the processor 608 may receive input(s) from a user to switch between different modes, detect conditions for which operation under one of the modes is desirable, and/or otherwise determine that the image capture device 602 should operate in a particular mode. A mode may refer to a way or a manner in which the image capture device 602 operates to capture images/videos. A spherical capture mode may refer to a way or a manner in which the image capture device 602 operates to capture spherical visual content (e.g., spherical images/videos). A non-spherical capture mode may refer to a way or a manner in which the image capture device 602 operates to capture non-spherical visual content (e.g., non-spherical images/videos).

For example, when the image capture device 602 is operating in the spherical capture mode, the image capture device 602 may utilize light received within fields of view of both optical elements 604A, 604B to generate spherical images/videos. When the image capture device 602 is operating in the non-spherical capture mode, the image capture device 602 may utilize light received within one of the fields of view of the optical elements 604A, 604B to generate non-spherical images/videos. That is, one of the optical elements 604A, 604B and/or one of the image sensors 606A, 606B may be turned off/not operating to capture images/videos. This may allow the image capture device 602 to operate in a lower-power mode (e.g., consuming less processing power, battery) than when operating in the spherical capture mode.

Operation of the image capture device in the non-spherical capture mode may include use of light received within the fields of view of both optical elements 604A, 604B. For example, light received within the field of view of the optical element B 604B may be used to generate (by the image sensor B 606B) visual content for inclusion in the non-spherical visual content while the light received within the field of view of the optical element 604A may be used to determine which portion(s) of the visual content generated by the image sensor B 606B are included in the non-spherical visual content. As another example, light received within the field of view of the optical element B 604B may be used to generate (by the image sensor B 606B) visual content for inclusion in the non-spherical visual content while the light received within the field of view of the optical element 604A may be used to control the optical element B 604B and/or the image sensor B 606B. For instance, the visual content generated by the image sensor A 606A (based on light guided thereto by the optical element A 604A) may be analyzed to determine which portion(s) of the visual content generated by the image sensor B 606B are included in the non-spherical visual content and/or how the optical element B 604B and/or the image sensor B 606B are operated/controlled to generate visual content.

In some implementations, the processing resources (e.g., provided by the processor 608) of the image capture device 602 may be directed to different functions based on whether the image capture device 602 is operating in the spherical capture mode or the non-spherical capture mode. For example, the processor 608 may include a single processing unit that reserves a portion of its processing capabilities for images/videos captured by the image sensor A 606A and another portion of its processing capabilities for images/videos captured by the image sensor B 606B. The processor 608 may include multiple processing units (e.g., multiple chips) with different processor units dedicated to different image sensors 606A, 606B.

When the image capture device 602 is operating in the spherical capture mode, the respective portions of processing capabilities of the processor 608 (e.g., respective portion of processing capabilities, respective chip) may be in operation for spherical capture of visual content. When the image capture device 602 is operating in the non-spherical capture mode, the portion of the processing resource of the processor 608 for the image sensor A 606A may be in operation for capture of reduced visual content (including capture of smaller field of view than spherical visual content) based on the visual information conveyed by output signals of the image sensor A 606A. That is, operation in the non-spherical capture mode may cause the image capture device 602 to operate as a non-spherical image capture device.

In some implementations, the capture of the reduced visual content by the image capture device 602 during the non-spherical capture mode may enable presentation of a stabilized view of the reduced visual content. That is, the reduced visual content may be stabilized for viewing on one or more displays. The stabilized view of the reduced content may have a viewing angle of at least 130-degrees. That is, the viewing window for the stabilized reduced visual content may be sized to include at least 130-degrees (e.g., 135-degrees) of view. Because the reduced visual content is captured based on light received within the optical element A 604A having a field of view greater than or equal to 180-degrees (e.g., 195-degrees), the viewing window for the reduced visual content may have greater freedom to move within the captured content to provide a stabilized view.

When the image capture device 602 is operating in the non-spherical capture mode, the portion of the processing resource of the processor 608 for the image sensor B 606B may not be in operation for capture of reduced visual content based on the visual information conveyed by output signals of the image sensor B 606B. That is, a portion of the processing resource of the processor 608 reserved for image sensor B 606B may not be used to process images/videos captured by the image sensor B 606B. Instead, the portion of the processing resource of the processor 608 reserved for image sensor B 606B may be in operation for the capture of reduced visual content based on the visual information conveyed by output signals of the image sensor A 606A. That is, a portion of the processing resource of the processor 608 reserved for image sensor B 606B may be used to process images/videos captured by the image sensor A 606A. For example, such portion of the processing resource of the processor 608 may be used to perform image classification, image stabilization, and/or other image processing. Such portion of the processing resource of the processor 608 may be used to augment the image processing performed by the other portion of the processing resource (e.g., the portion reserved for the image sensor A 606A) or to perform image processing separate/different from the image processing performed by the other portion of the processing resource.

In some implementations, the image capture device 602 may be configured to switch between the spherical capture mode, the non-spherical capture mode, and/or other modes based on the visual information of one or more of the image sensors 606A, 606B. For example, the visual information of one or more of the image sensors 606A, 606B may be analyzed by the processor 608 to determine whether the image capture device 602 should operate in the spherical capture mode, the non-spherical capture mode, and/or other modes, or to change from one mode to another. For instance, an image generated through the image sensor B 606 may be dark/black (e.g., based on the optical element B 604B being covered) and the processor 608 may operate the image capture device 602 in the non-spherical capture mode to capture reduced visual content using the optical element A 604A and the image sensor A 606A. Such setting of operation mode for the image capture device 602 may enable a user to change between spherical capture mode and non-spherical capture mode by simply uncovering/covering one of the optical elements 604A, 604B, rather than by manually setting the operation of the image capture device 602 in a particular mode by interacting with interfaces (e.g., physical/virtual buttons) of the image capture device 602.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate operation of an image capture device, such as the image capture device 602 shown in FIG. 6. The machine-readable instructions 100 may include one or more computer program components. The machine-readable instructions 100 may include one or more of a spherical mode component 102, a non-spherical mode component 104, a switch component 106, and/or other computer program components.

The spherical mode component 102 may be configured to operate an image capture device in a spherical capture mode and/or other modes. A spherical capture mode may refer to a way or a manner in which the image capture device operates to capture spherical visual content (e.g., spherical images/videos). An operation of the image capture device in the spherical capture mode may include generation of spherical visual content based on the first visual content (defined by the first visual information, which may be conveyed by the first output signal generated by the image sensor A 15A), the second visual content (defined by the second visual information, which may be conveyed by the second output signal generated by the image sensor B 15B), and/or other visual content. When the image capture device is operating in the spherical capture mode, the image capture device may utilize light received within fields of view of both optical elements 14A, 14B to generate spherical images/videos.

For example, referring to FIG. 6, the operation of the image capture device 602 in the spherical capture mode may include the following: the image sensor A 606A may generate a first output signal conveying first visual information defining first visual content based on light guided thereto by the optical element A 604A. The image sensor B 606B may generate a second output signal conveying second visual information defining second visual content based on light guided thereto by the optical element B 604B. Spherical visual content may be generated based on the first visual content and the second visual content. The first visual content and the second visual content may individually include hemispherical visual content. Hemispherical visual content may include visual content depicting at least half of a sphere (include 180-degrees or more of visual content capture).

Figure 7A:
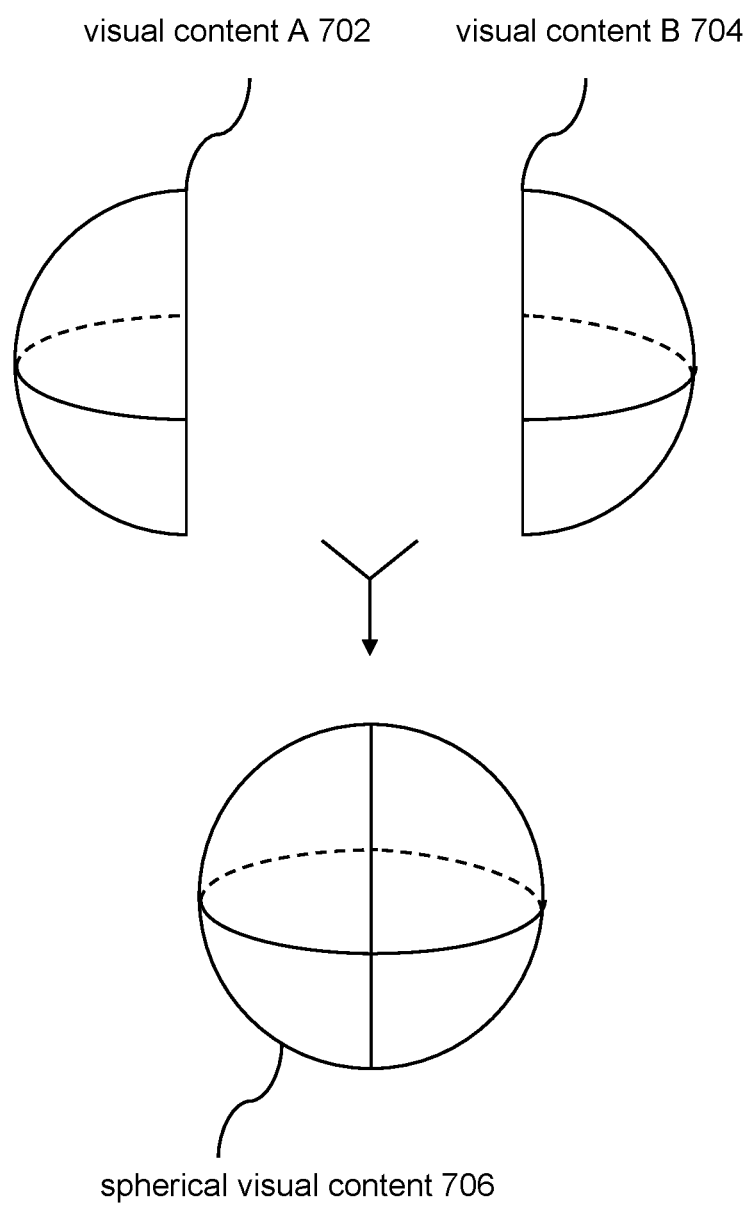
FIG. 7A illustrates an example generation of spherical visual content.

For example, referring to FIG. 7A, the first visual content may include visual content A 702 and the second visual content may include visual content B 704. Operation of the image capture device 602 in the spherical capture mode may include generation of spherical visual content 706 based on the visual content A 702, the visual content B 704, and/or other visual content. For instance, the spherical visual content 706 may be generated based on a combination of the visual content A 702 and the visual content B 704. One or more portions of the visual content A 702 may be stitched with one or more portions of the visual content B 704 to generate the spherical visual content 706. In some embodiments, the generation of the spherical visual content 706 may include encoding of the visual content A 702 stitched with the visual content B 704. That is, the spherical visual content 706 may be stored as a single sphere. In some embodiments, the generation of the spherical visual content 706 may include separate storage of the visual content A 702 and the visual content B 704, with the visual content A 702 and the visual content B 704 being stitched as needed to provide a view of the spherical visual content 706. That is, the spherical visual content 706 may be stored as two halves of a sphere.

The non-spherical mode component 104 may be configured to operate the image capture device in a non-spherical capture mode and/or other modes. A non-spherical capture mode may refer to a way or a manner in which the image capture device 602 operates to capture non-spherical visual content (e.g., non-spherical images/videos, two-dimensional images/videos). An operation of the image capture device in the non-spherical capture mode may include generation of non-spherical visual content based on the first visual content (defined by the first visual information, which may be conveyed by the first output signal generated by the image sensor A 15A) or the second visual content (defined by the second visual information, which may be conveyed by the second output signal generated by the image sensor B 15B), and/or other visual content.

When the image capture device is operating in the non-spherical capture mode, the image capture device utilize light received within one of the fields of view of the optical elements 14A, 14B to generate non-spherical images/videos. For instance, one of the optical elements 14A, 14B and/or one of the image sensors 15A, 15B may be turned off and/or not operating to capture images/videos. This may allow the image capture device to operate in a lower-power mode (e.g., consuming less processing power, battery) than when operating in the spherical capture mode.

Figure 7B:
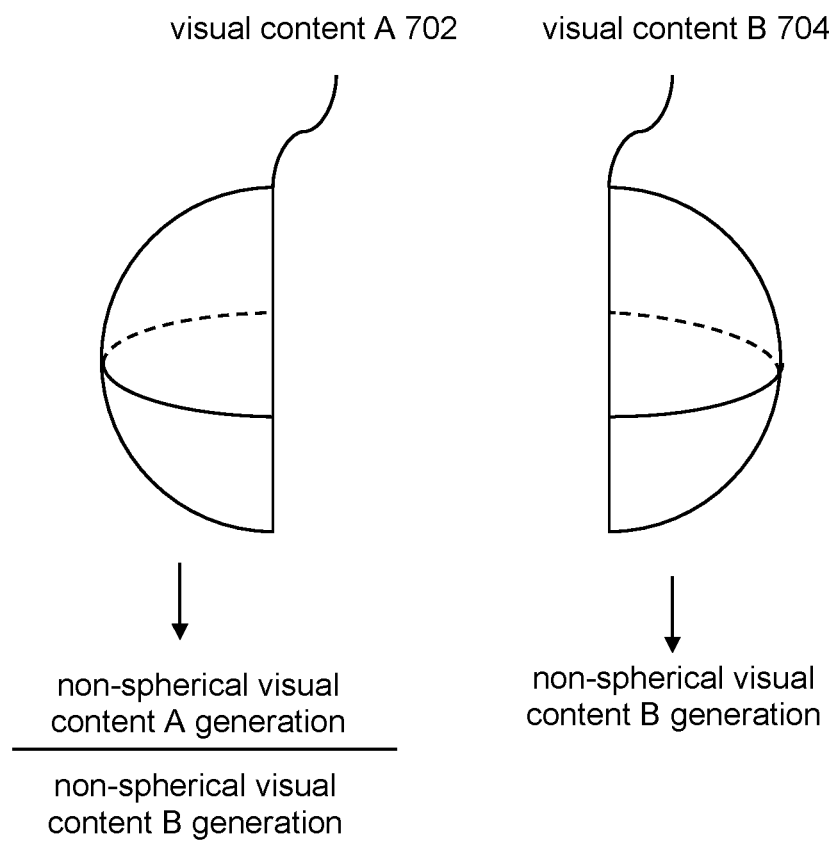
FIG. 7B illustrates an example generation of non-spherical visual content.

For example, referring to FIG. 6, the operation of the image capture device 602 in the non-spherical capture mode may include the following: the image sensor A 606A may generate an output signal conveying visual information defining visual content based on light guided thereto by the optical element A 604A. Non-spherical visual content may be generated based on the visual content. The visual content may include hemispherical visual content, such as the visual content A 702 (shown in FIG. 7A). Alternatively, the image sensor B 606B may generate an output signal conveying visual information defining visual content based on light guided thereto by the optical element B 604B. Non-spherical visual content may be generated based on the visual content. The visual content may include hemispherical visual content, such as the visual content B 704 (shown in FIG. 7B). Thus, visual content captured by different image sensors 606A, 606B may be used to generate different non-spherical visual content. The image sensors 606A, 606B may capture visual content based on light received from different directions. For example, the image sensor 606A may be a back-facing image sensor (selfie-image sensor to capture visual content of the user of the image capture device 602)

while the image sensor 606B may be a front-facing image sensor (outward-facing image sensor to capture front of the image capture device 602)

The images/videos captured by the image capture device 602 during operation in the non-spherical capture mode may not be stitched together but may rather be used for non-spherical image/video generation. For instance, the visual content A 702 may be used to generate non-spherical visual content A while the visual content A 702 may be used to generate non-spherical visual content B.

When the image capture device is operating in the non-spherical capture mode, the image capture device may utilize visual content captured by one of the image sensors 15A, 15B to determine which portion(s) of the visual content captured by the other image sensor are included in the non-spherical visual content generated by the image capture device. For example, referring to FIG. 7B, the visual content A 702 may be used to determine which portion(s) of the visual content B 704 are included the non-spherical visual content generated by the image capture device.

For instance, the operation of the image capture device in the non-spherical capture mode may include inclusion of one or more extents (spatial portions) of the visual content B 704 within the non-spherical visual content. The extent(s) of the visual content B 704 included within the non-spherical visual content may be determined based on a gaze of a user within the visual content A 702. For example, the visual content A 702 may include images/video frames captured by a selfie-image sensor while the visual content B 704 may include images/video frames captured by a front-facing image sensor. Which portion(s) of the include images/video frames captured by the front-facing image sensor are included within the non-spherical visual content may be determined by tracking user's gaze, which may be depicted within images/video frames captured by the selfie-image sensor.

A user's gaze may refer to how a user of the image capture device is looking at something, such as whether the user is looking at a particular object and/or an event steadily (e.g., the user is looking at an object or an event for a threshold amount of time). A user's gaze may be characterized by one or more directions in which the user is looking. The direction(s) in which the user is looking may correspond to viewing direction(s) for visual content (e.g., spherical visual content). A user's gaze may be determined based on analysis of one or more body parts of the user. For example, a user's gaze may be determined based on visual analysis of the location/orientation of the user's eyes, the user's iris, the user's nose, the user's head, and/or other parts of the user's head. The determination of user's gaze may be facilitated through use of other information about the user, such as information on the user's body pose (e.g., the user extending a hand/finger in a particular direction), information on the user's vocal cues about locations of interest (e.g., the user stating whether the location of interest is in front, to the left, to the right, behind, above, or below the user), and/or other information.

The images/video frames captured by the selfie-image sensor may be used to track the user's gaze and automatically determine a punch-out of the images/video frames captured by the front-facing image sensor. For example, the user's gaze tracked using the selfie-image sensor may be used to determine where interesting things are happening within the images/video frames captured by the front-facing image sensor. Object of interest and/or event of interest detection in images/video frames captured by the front-facing image sensor may be performed based on analysis of images/video frames captured by the selfie-image sensor. Such generation of non-spherical visual content may enable generation of non-spherical visual content that includes depiction of objects (e.g., material things, persons) and/or events (e.g., action, activity, motion) on which the user of the image capture device is focused (e.g., looking at).

Figure 8A:
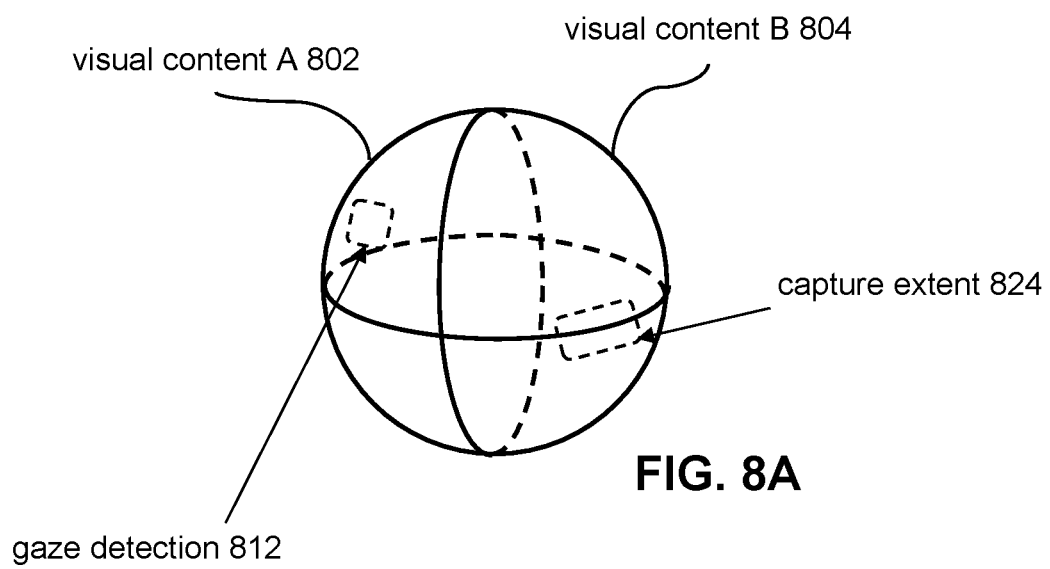
FIG. 8A illustrates examples of gaze detection and capture extent.

FIG. 8A illustrates examples of gaze detection and capture extent for spherical visual content. The spherical visual content in FIG. 8A may be composed of visual content A 802 (e.g., back hemispherical visual content) and visual content B 804 (e.g., front hemispherical visual content). The visual content A 802 may be analyzed to detect the gaze of a user. For example, one or more of the user's eyes, the user's iris, the user's nose, the user's head, other parts of the user's head, and/or other parts of the user's body may be detected to determine a spatial portion of the visual content A 802 that may be used for gaze detection. For instance, based on the location of depiction of the user's eyes, the user's iris, the user's nose, the user's head, and/or other parts of the user's head within the visual content A 802, a gaze detection 812 may be performed within an extent of the visual content A 802.

The gaze detection 812 may determine the gaze of the user, such as in which direction(s) the user is looking. For example, the gaze detection 812 may determine that the user is looking to the right of the front of the image capture device. Based on the gaze of the user, a punch-out including a capture extent 824 of the visual content B 804 may be used to generate non-spherical visual content. Based on the gaze of the user, thing(s) (e.g., object(s), event(s)) of interest may be determined to be depicted within the capture extent 824 of the visual content B 804. The capture extent 824 may be characterized by a viewing direction (e.g., centered in the capture extent 834), a viewing size, and/or viewing rotation.

In some implementations, face classification may be used to determine the gaze of the user and/or the location of thing(s) of interest depicted within the visual content. Facial classification of visual content may include detection of face(s) depicted within the visual content and classification of the detected face(s). Classification of a face may include categorization and/or labeling of the face based on one or more features of the face. Features of the face may include distinctive attributes and/or aspects of the face. For example, features of the face may include one or more of face parts (e.g., eyes, eyelids, eyebrows, nose, cheeks, mouth, teeth), one or more positions and/or movement of face parts (e.g., open mouth, mouth expression, closed eyes, gaze direction), one or more emotions and/or one or more expressions displayed on the face, and/or other features of the face. The classification of a face may depend on the length for which one or more features are maintained (e.g., length of expression display on the face).

Based on the classification of one or more faces, location of depiction of interest (depiction of things of interest) within the visual content may be identified within the spherical video. For example, one or more faces within spherical visual content (e.g., shown in FIG. 8A) may be analyzed to classify the face(s). Based on the types of expressions on face(s), the direction(s) of gaze, and/or the time(s) that the expressions remain on face(s), the face(s) may be categories and/or labeled into a particular classification. Based on the classification, a depiction of interest within the visual content may be identified as being located within the capture extent 824.

The non-spherical visual content may be generated to include a particular edit of the spherical visual content. That is, portions of the spherical visual content may be edited for inclusion in the non-spherical visual content. The non-spherical visual content may include the depiction of interest (visual content within the capture extent 824). Based on the classification of face(s), the non-spherical visual content may also include one or more of the detected face(s). For example, one type of classification of face(s) may result in the depiction of face(s) (visual content within which face(s) are depicted) being included within the non-spherical visual content while another type of classification of face(s) may result in the depiction of face(s) not being included within the non-spherical visual content.

For instance, a spectacular move by a player during a sporting event may cause particular reactions (e.g., cheering faces) on the faces of a crowd watching the sporting event. Based on the classification of the faces, non-spherical visual content (two-dimensional visual content of a video edit) of the sporting event may be generated to include a punch-out of the move by the player (with the duration and spatial extent of the punch-out determined based on the classification of the faces), followed by a punch-out of the crowd reaction. Based on the classification of the faces, non-spherical visual content (two-dimensional visual content of a video edit) of the sporting event may be generated to simultaneous include punch-outs of the player and the crowd reaction. Based on the classification of the faces, non-spherical visual content (two-dimensional visual content of a video edit) of the sporting event may be generated to include a punch-outs of the player, and no punch-out of the crowd. Thus, spherical visual content may be automatically edited into non-spherical visual content based on detection of faces, with different types of video edits/non-spherical visual content being generated based on the classification of detected faces.

The location of depiction of interest within visual content may be determined directly based on the gaze of the user and/or indirectly based on the gaze of the user. For example, based on the gaze of the user (as determined from the gaze detection 812), the depiction of interest may be determined to be located within the capture extent 824. Alternatively, based on the gaze of the user (as determined from the gaze detection 812), visual analysis and/or computer vision techniques may be performed one or more extents of the visual content B 804. For example, visual analysis/computer vision may be performed within an extent of the visual content B 804 that is larger than and includes the capture extent 824. The visual analysis/computer vision may be performed to identify depiction(s) of interest. For example, based on the visual analysis/computer vision, the depiction of interest may be identified as being located within the capture extent 824. In other words, the gaze of the user may be used to identify which portions of the visual content may be analyzed for depiction of interest identification. Such localization of the visual analysis/computer vision within the visual content may provide for resource savings (e.g., computing power, time, memory, power consumption) compared to performing visual analysis/computer vision over the entirety of the visual content (e.g., entire spherical visual content).

Figure 8B:
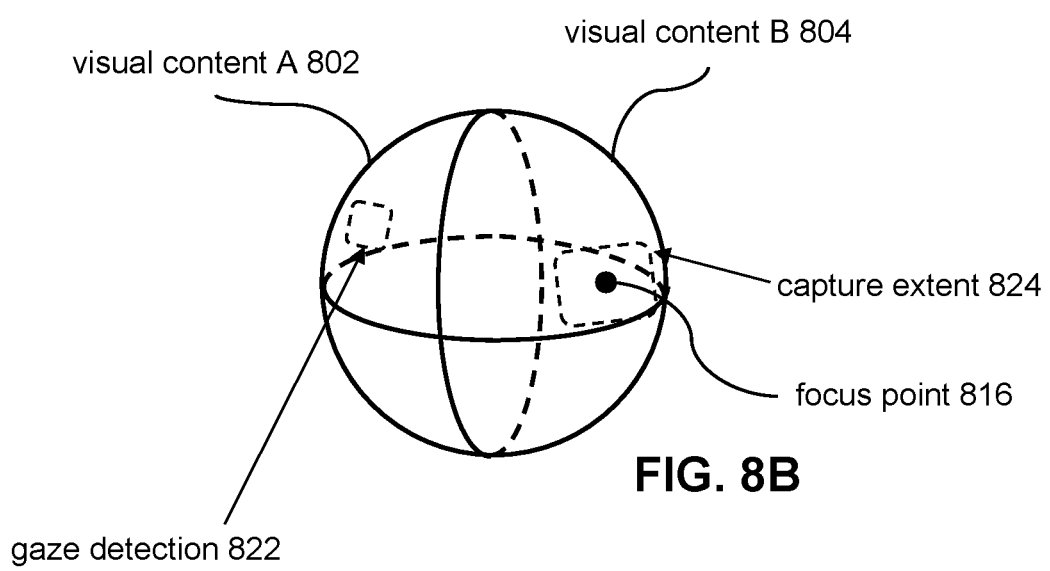
FIG. 8B illustrates examples of gaze detection, capture extent, and focus point.

When the image capture device is operating in the non-spherical capture mode, the image capture device may utilize visual content captured by one of the image sensors 15A, 15B to control the other the image sensor and/or the optical element corresponding to the other optical image sensor. For example, referring to FIG. 8B, the visual content A 802 may be used to control the image sensor and/or the optical element used to capture the visual content B 804. For instance, a gaze detection 822 may be performed within the visual content A 802 to determine that a depiction of interest is located within a capture extent 824 of the visual content B 804. Based on the gaze of the user (as determined from the gaze detection 822), the focus of the image capture device may be set and/or changed for capture of the visual content B 804. For example, the focus of the image capture device may be directed to a focus point 816. While the focus point 816 is located in the center of the capture extent 824 in FIG. 8B, this is merely an example and not mean to be limiting. A focus point may be located in non-center point of a capture extent.

Figure 8C:
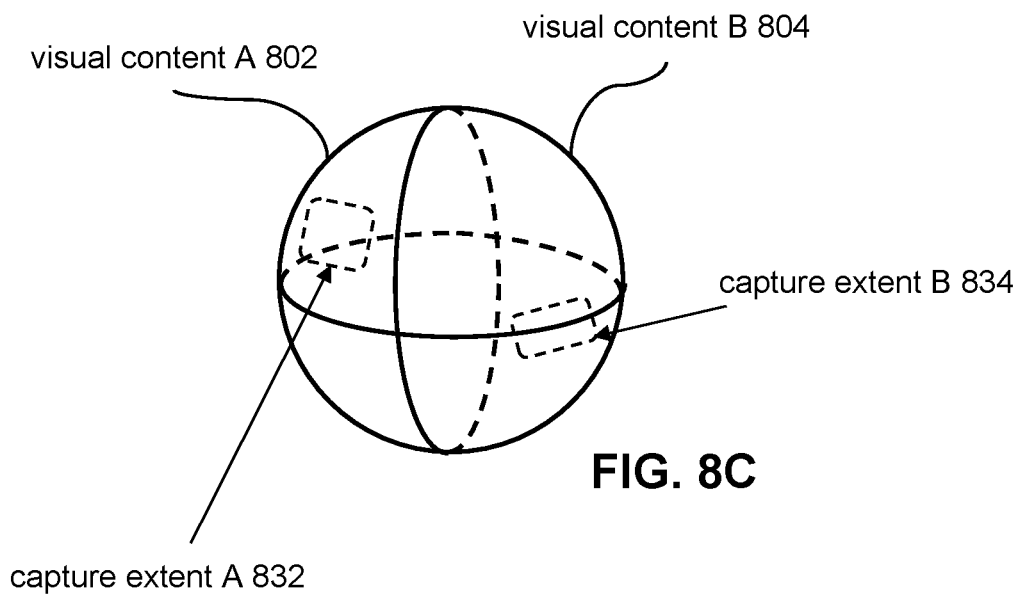
FIG. 8C illustrates examples of capture extents.

In some implementations, the operation of the image capture device in the non-spherical capture mode may include combination of two or more portions of multiple visual content within the non-spherical visual content. For example, referring to FIG. 8C, non-spherical visual content may be generated to include one or more portions (spatial extent, time durations) of the visual content A 802 and one or more portions of the visual content B 804. For instance, non-spherical visual content may be generated to include a portion of the visual content A 802 within a capture extent A 832 and a portion of the visual content B 804 within a capture extent B 834. The directions, sizes, and/or the rotations of the capture extents 832, 834 may be determined based on gaze detection, visual analysis, computer vision technique, audio analysis, and/or other information.

The portions of multiple visual content included in the non-spherical visual content may be time-synchronized based on operation of a single image capture device. That is, because the multiple visual content are captured by multiple image sensors of a single image capture device (e.g., the image sensors 606A, 606B of the image capture device 602), the multiple visual content may already be time-synchronized and there may not be any need to synchronize timing of the multiple visual content. For example, the image capture device 602 may capture one set of images/video frames using the image sensor A 606A and another set of images/video frames using the image sensors B 606B. The two sets of images/video frames may be captured during the same capture duration and may be associated with same capture times. Thus, the two sets of images/video frames are already time-synchronized, and the two sets of images/video frames may provide two feeds of visual content that are time-synchronized with each other.

In some implementations, portions of multiple visual content may be spatially arranged within the non-spherical visual content for simultaneous presentation. For example, images/video frames and/or portions of images/video frames captured by different image sensors may be combined into a single view, such as in a picture-in-picture presentation, a split-screen presentation, and/or other presentation.

Figure 9A:
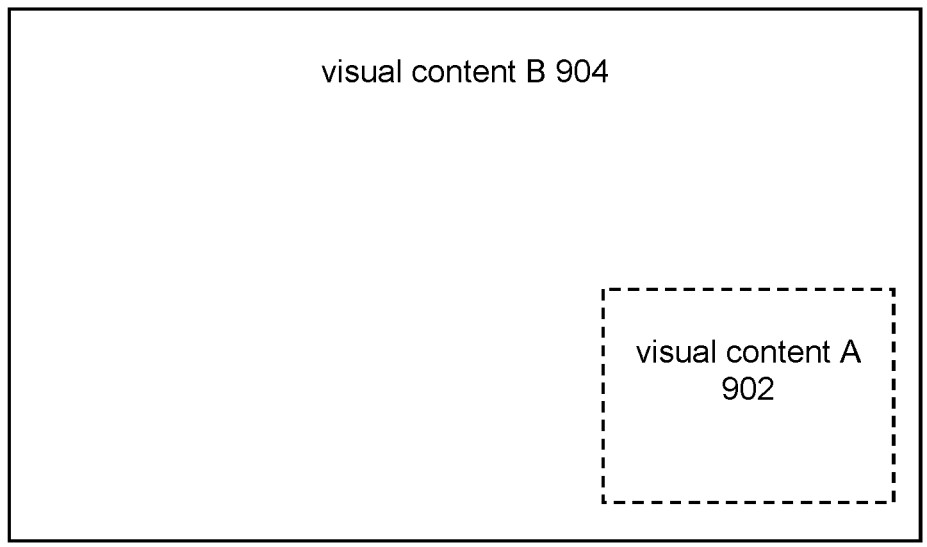
FIG. 9A illustrates an example spatial arrangement of visual content presentation.

FIG. 9A illustrates an example spatial arrangement of visual content presentation. The presentation shown in FIG. 9A may include a presentation of visual content A 902 within a presentation of visual content B 904. That is, the presentation shown in FIG. 9A may include a picture-in-picture presentation, where the inner picture are includes the visual content A 902 and the outer picture area includes the visual content B 904.

Figure 9B:
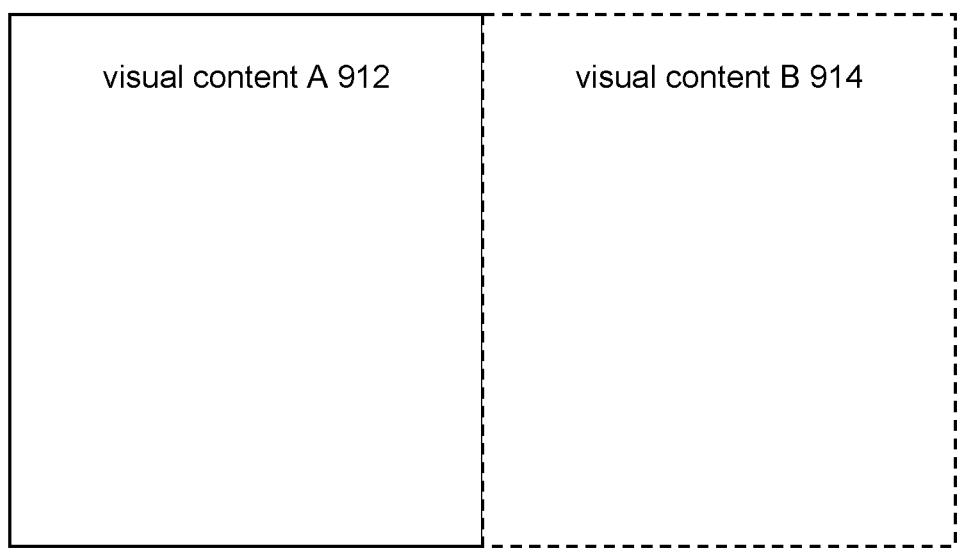
FIG. 9B illustrates an example spatial arrangement of visual content presentation.

FIG. 9B illustrates an example spatial arrangement of visual content presentation. The presentation shown in FIG. 9B may include a presentation of visual content A 912 next to a presentation of visual content B 914. That is, the presentation shown in FIG. 9B may include a split-screen presentation, where the left picture area includes the visual content A 912 and the right picture area includes the visual content B 914.

The arrangement of visual content within a presentation may be determined based on types of depictions within the visual content. For example, referring to FIG. 9A, the outer picture area may include the visual content B 904 based on the visual content B 904 including depiction of things in front of an image capture device while the inner picture area may include the visual content A 902 based on the visual content A 902 including depiction of things behind the image capture device, such as a user of the image capture device.

The non-spherical visual content may be stored for later playback, shared with one or more users and/or computing devices, and/or live-streamed to one or more users and/or computer devices. For example, front and back images/video frames captured by a single spherical image capture device (e.g., 360-degree camera) may be combined into non-spherical visual content. For instance, the front-facing image sensor and the front-facing optical element may be used to capture a center-weighted, stabilized, standard front image (e.g., 1080P, 1440P, other resolution). The front image may include visual content captured through the entire field of view of the front-facing optical element or the visual content capture through a portion of the field of view of the front-facing optical element. The front image may be displayed on a display screen of the image capture device, which may allow the user to frame the front-shot as if a non-spherical image capture device were being used.

Multiple visual content captured by the spherical image capture device may be processed individually. Additionally, multiple visual content captured by the spherical image capture device may be provided for presentation and/or generation of non-spherical visual content without stitching, thereby requiring consumption of less resource than when the spherical image capture device is used to capture and generate spherical visual content.

The back-facing image sensor and the back-facing optical element may be used to capture a back image including a depiction of the user. The back image may include visual content captured through the entire field of view of the back-facing optical element or the visual content capture through a portion of the field of view of the back-facing optical element. For example, the back image may include the visual content captured through a portion of the field of view that includes the user. Face and/or person tracking may be used to determine how the user is depicted within the back image (user framing). User framing may be maintained within the back image regardless of how the image capture device is being held by the user. That is, the portion of the visual content included in the back image may be determined to include a particular shot of the user. Such a generation of back image may provide an automatic selfie image of the user. Thus, a user would not have to manually position themselves for a selfie-shot and may concentrate on composing the shot for the front image. The back image may be placed in a picture-in-picture arrangement with the front picture, such as shown in FIG. 9A.

The arrangement of visual content within a presentation may be changed. For example, referring to FIG. 9A, the visual content included within the outer picture area and the inner picture area may be changed. For example, a user may interact with one or more options presented on a user interface to manually set which visual content (which image/video feed) is presented in the different positions. The placement of the visual content may depend on inclusion of depiction of interest within the visual content. For example, based on a depiction of interest occurring within the visual content A 902, the presentation of inner and outer picture areas may be changed so that depiction of interest is presented within the outer (larger) picture area. The placement of the visual content may depend on audio associated with the visual content. For example, based on audio recorded with the visual content indicating that a depiction of interest is occurring within the visual content A 902, presentation of inner and outer picture areas may be changed so that depiction of interest is presented within the outer (larger) picture area.

As another example, the extent of area taken up by the inner picture area and/or the outer picture may change. For example, the size and/or the shape of the inner picture area may change based on the depiction of interest within the visual content A 902. For instance, based on the visual content A 902 including a depiction of interest (e.g., the inner picture area showing a depiction of interest or about to show a depiction of interest), the size of the inner picture area may be increased. Based on a depiction of interest within the visual content A 902 spanning a large lateral area (compared to the vertical area of the depiction of interest), the shape of the inner picture area may be changed to accommodate the large lateral area. For instance, the shape of the inner picture area may change from a square to a rectangle, such as the left side of the square moving to the left to extend the width of the rectangle.

In some implementations, different visual content may capture content of different types. For example, visual content captured by front-facing image sensor may include primary content while visual content captured back-facing image sensor may include supplemental content. Primary content may refer to content of greater importance than supplemental content. Primary content may include content that is directly relevant to the subject of visual content capture. Supplemental content may refer to content of less importance than primary content. Supplemental content may include content that is indirectly relevant to the subject of visual content capture. Supplemental content may enhance the primary content.

For example, the image capture device may be used to capture visual content of an activity. Primary content may include depiction of the activity, and supplemental content may include depiction of things related to and/or associated with the activity. For instance, the activity may include a sporting activity, and the primary content may include depiction of players engaged in the sporting activity while the supplemental content may include depiction of crowds at the sporting activity.

The primary content and the supplemental content may be used to generate non-spherical visual content. The non-spherical visual content may be a video edit of the visual content. A video edit may refer to an arrangement and/or manipulation of one or more portions of visual content for playback. A video edit may define which portions of the visual content are included for playback and the order in which the portions are to be presented on playback. For example, referring to the example of the sporting activity, a video edit generated from the primary content and the supplemental content may include video footage/images of the players of the sporting activity (primary content) and video footage/images of the spectators of the activity (supplemental content). The supplemental content may be superimposed into the primary content, such as shown in FIG. 9A, and/or presented with the primary content, such as shown in FIG. 9B.

In some implementations, one of the primary content and/or the supplemental content may be used to identify when other content should be combined within the non-spherical visual content. The primary content may be used to identify supplemental content for integration within the non-spherical visual content (e.g., video edit). For example, a depiction of interest within the primary content may be used to identify the corresponding supplemental content. For instance, a depiction of interest within the primary content may include a spectacular move by a player during a sporting event. The moment and/or the location in which the spectacular move occur within the primary content may be used to identify the moment and/or the location of the corresponding reaction from the crowd within the supplemental content for inclusion in the non-spherical visual content.

The supplemental content may be used to identify primary content for inclusion in the non-spherical visual content (e.g., video edit). For example, the presence/occurring of depiction of interest (a moment of interest) within the primary content may be identified based on analysis of the supplemental content. For instance, an interesting event may be determined to happen within the activity captured in the primary content based on reactions of crowd captured in the supplemental content. The supplemental content may be used to edit and/or trim the primary content into the non-spherical visual content. For example, a "best" scenes video edit may be generated from a five-minute footage of primary content by editing/trimming down footage of the primary content to a thirty-second video edit. The footage of primary content may be edited/trimmed based on reactions (e.g., cheering, positive, cool reactions) found in the supplemental content.

In some implementations, portions of multiple visual content may be temporally arranged within the non-spherical visual content for sequential presentation. For example, images/video frames and/or portions of images/video frames captured by different image sensors may be arranged in a sequence so that they are presented in a particular order.

Figure 9C:
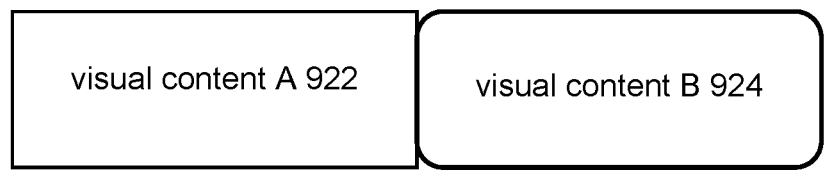
FIG. 9C illustrates an example timing arrangement of visual content presentation.
Figure 9D:
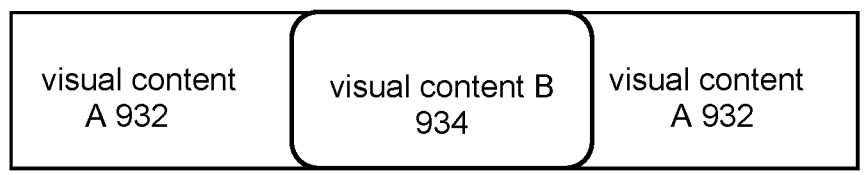
FIG. 9D illustrates an example timing arrangement of visual content presentation.

FIGS. 9C and 9D illustrate example timing arrangements of visual content. In the timing arrangement shown in FIG. 9C, visual content A 922 may be presented first in the non-spherical visual content. Visual content B 924 may be presented after the presentation of the visual content A 922. In the timing arrangement shown in FIG. 9D, a portion of visual content A 922 may be presented first in the non-spherical visual content. Visual content B 924 may be presented after the presentation of the portion of the visual content A 922. Another portion of the visual content A 922 may be presented after the presentation of the visual content B 934.

In some implementations, portions of multiple visual content may be temporally arranged for sequential presentation based on audio associated with one or both of the visual content. For example, referring to FIG. 9D, based on audio recorded with the visual content A 933 indicating that a depiction of interest is occurring within the visual content B 934, presentation of the visual content A 932 may change to the presentation of the visual content B 934. When the depiction of interest is over, the presentation may change back to the visual content A 932.

In some implementations, portions of the multiple visual content may be temporally arranged for sequential presentation based on identification of one or more depictions of interest within the portions of the multiple visual content. For example, referring to FIG. 9C, a depiction of interest may be identified within the visual content A 922 and another depiction of interest may be identified within the visual content B 924. The depiction of interest within the visual content A 922 may occur earlier than the depiction of interest within the visual content B 924. Based on the sequence of occurrence of depictions of interest, the portions of multiple visual content may be temporally arranged for sequential presentation as such in FIG. 9C, such that the visual content A 922 is presented first to include the presentation of the depiction of interest within the visual content A 922, and the visual content B 924 is presented second to include the presentation of the depiction of interest within the visual content B 924.

Figure 9E:
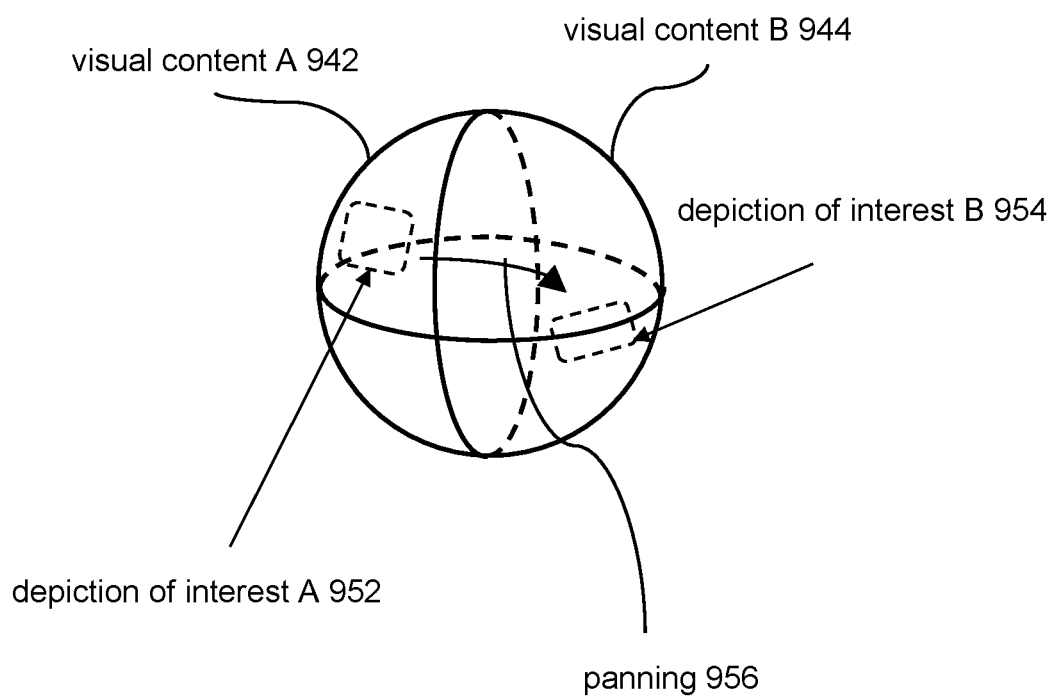
FIG. 9E illustrates an example panning between depictions of interest.

In some implementations, a sequential presentation of portions of multiple visual content may include a panning transition from a depiction of interest within one visual content to a depiction of interest within another visual content. FIG. 9E illustrates an example panning between depictions of interest. As shown in FIG. 9E, a portion of visual content A 942 may include a depiction of interest A 952, and a portion of visual content B 944 may include a depiction of interest B 964. A sequence presentation of the portions of the visual content A 942 and the visual content B 944 may include a presentation of the depiction of interest A 952 followed by a presentation of the depiction of interest B 954. The presentation of the depiction of interest A 952 may change to the presentation of the depiction of interest B 954 by using a panning 956.

The panning 956 may include a viewing window (punchout) of the visual content moving from being centered on the depiction of interest A 952 to being centered on the depiction of interest B 954. While the viewing window (punch-out) is entirely within the visual content A 942 or the visual content B 944, the presentation of the corresponding portion of the visual content 942, 944 do not require stitching of the visual content 942, 944. When the viewing window (punch-out) includes both the visual content A 942 and the visual content B 944 (the viewing window/punch-out is moving across the boundary of the visual content A 942 and the visual content B 944), the visual content 942, 944 (or portions of the visual content 942, 944 within the viewing window/punch-out) may need to be stitched. Limiting stitching of the visual content 942, 944 to those instances in which portions of both visual content 942, 944 are being presented may provide for resource savings (e.g., computing power, time, memory, power consumption) compared to stitching visual content 942, 944 for the entire duration of the presentation.

In some implementations, stitching of the visual content 942, 944 may be further limited based on the speed of the panning 956 and/or the types of depictions within the visual content 942, 944. For example, if the panning 956 is performed at high speed, then lower quality stitching may be performed for the visual content 942, 944 than if the panning 956 is performed at low speed. As another example, if the depictions of the visual content 942, 944 at the boundary across which the viewing window/punch-out moves includes non-distinctive features (e.g., sky, ocean, sand), lower quality stitching may be performed while if the depictions of the visual content 942, 944 at the boundary across which the viewing window/punch-out moves includes distinctive features (e.g., face, persons), higher quality stitching may be performed.

Non-spherical visual content may be generated as encoded visual content and/or instructions for rendering visual content. For example, non-spherical visual content including multiple portions of visual content captured by different image sensors may be encoded for streaming and/or playback. As another example, non-spherical visual content including multiple portions of visual content captured by different image sensors may be stored as instructions that identify which portions of the visual content should be presented and the order in which the portions are to be presented. For example, different visual content captured by different image sensors may be stored separately, and the instructions may be used to render the presentation of non-spherical visual content from the separately stored visual content. Such generation of non-spherical visual content may enable later alteration of the non-spherical visual content from the separately stored visual content.

The switch component 106 may be configured to switch the operation of the image capture device between the spherical capture mode and the non-spherical capture mode. Thus, the image capture device may be used to create both spherical visual content and non-spherical visual content, depending on the mode in which it is operating. The switch component 106 may switch the operation of the image capture device between different modes manually and/or automatically. For instance, the switch component 106 may manually switch the operation of the image capture device between different modes based on reception of input(s) from a user to switch between different modes.

The switch component 106 may automatically switch the operation of the image capture device between different modes based on detection of conditions for which operation under one of the modes is desirable. For example, the switch component 106 may manually switch the operation of the image capture device between different modes based on visual information of one or more of the image sensors 15A, 15B. For instance, the visual information of one or more of the image sensors 15A, 15B may be analyzed to determine whether the image capture device should operate in the spherical capture mode, the non-spherical capture mode, and/or other modes, or to change from one mode to another. For example, an image generated through the image sensor B 15B may be dark/black (e.g., based on the optical element B 14B being covered) and the switch component 106 may switch the operation of the image capture device to non-spherical capture mode and/or operate the image capture device in the non-spherical capture mode to capture reduced visual content using the optical element A 14A and the image sensor A 15A.

Such setting of operation mode for the image capture device may enable a user to change between spherical capture mode and non-spherical capture mode by simply uncovering/covering one of the optical elements 14A, 14B, rather than by manually setting the operation of the image capture device in a particular mode by interacting with interfaces (e.g., physical/virtual buttons) of the image capture device.

As another example, visual information of the image sensors 15A, 15B may be compared to determine whether similar or different depiction of things are being captured within the visual content. For instance, based on the image sensors 15A, 15B being used to capture similar visual content (e.g., depiction of an activity, depiction of a scenery), the switch component 106 may switch the operation of the image capture device to spherical capture mode and/or operate the image capture device in the spherical capture mode to capture spherical visual content using the optical elements 14A, 14B and the image sensors 15A, 15B. Based on the image sensors 15A, 15B being used to capture different visual content (e.g., depiction of a particular person (user of the image capture device) in one visual content, depiction of other thing in the other visual content), the switch component 106 may switch the operation of the image capture device to non-spherical capture mode and/or operate the image capture device in the non-spherical capture mode.

Such setting of operation mode for the image capture device may enable a user to change between spherical capture mode and non-spherical capture mode based on the context in which the image capture device is used. For example, the image capture device being held/carried by a user may result in the image capture device operating in the non-spherical capture mode to provide a selfie and third-person views of the captured content, while the image capture device being placed in the middle of an activity may result in the image capture device operating in the spherical capture mode to provide a spherical vide of the activity. Other conditions for switching the operation of the image capture device between the spherical capture mode and the non-spherical capture mode are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
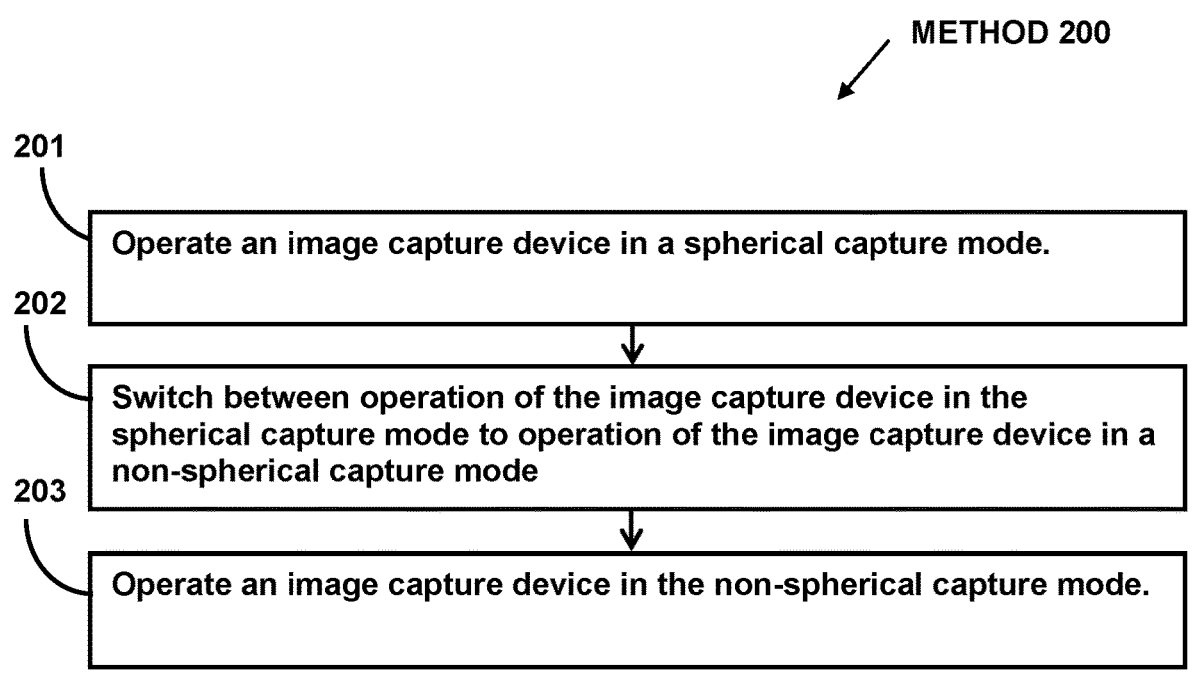
FIG. 2 illustrates a method for operating an image capture device with a spherical capture mode and a non-spherical capture mode.

FIG. 2 illustrates method 200 for operating an image capture device. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, an image capture device may include a first image sensor, a second image sensor, and/or other components. The first image sensor may be configured to generate a first output signal conveying first visual information based on light that becomes incident thereon. The first visual information may define first visual content. The second image sensor may be configured to generate a second output signal conveying second visual information based on light that becomes incident thereon. The second visual information may define second visual content.

At operation 201, the image capture device may be operated in a spherical capture mode. Operation of the image capture device in the spherical capture mode may include generation of spherical visual content based on the first visual content and the second visual content. In some implementation, operation 201 may be performed by a processor component the same as or similar to the spherical mode component 102 (Shown in FIG. 1 and described herein).

At operation 202, operation of the image capture device in may be switched from the spherical capture mode to the non-spherical capture mode. In some implementations, operation 202 may be performed by a processor component the same as or similar to the switch component 106 (Shown in FIG. 1 and described herein).

At operation 203, the image capture device may be operated in the non-spherical capture mode. Operation of the image capture device in the non-spherical capture mode may include generation of non-spherical visual content based on the first visual content. In some implementations, operation 203 may be performed by a processor component the same as or similar to the non-spherical mode component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
   a housing;
   a first image sensor carried by the housing and configured to generate a first output signal conveying first visual information based on light that becomes incident thereon, the first visual information defining first visual content;
   a second image sensor carried by the housing and configured to generate a second output signal conveying second visual information based on light that becomes incident thereon, the second visual information defining second visual content;

a front-facing optical element configured to guide light within a first field of view to the first image sensor, the first field of view being greater than 180 degrees, the front-facing optical element being carried by the housing;

a back-facing optical element configured to guide light within a second field of view to the second image sensor, the second field of view including a user of the image capture device when the image capture device is held by the user such that the second visual content includes depiction of the user, the second field of view being greater than 180 degrees, the back-facing optical element being carried by the housing such that a peripheral portion of the first field of view and a peripheral portion of the second field of view overlap, the overlap of the peripheral portion of the first field of view and the peripheral portion of the second field of view enabling spherical capture of visual content based on the first visual content and the second visual content; and one or more physical processors carried by the housing, the one or more physical processors configured by machine-readable instructions to:

operate the image capture device in a spherical capture mode, wherein an operation of the image capture device in the spherical capture mode includes generation of spherical visual content based on stitching of the first visual content and the second visual content;

operate the image capture device in a non-spherical capture mode, wherein an operation of the image capture device in the non-spherical capture mode includes generation of non-spherical visual content that includes an extent of the first visual content, wherein the extent of the first visual content included within the non-spherical visual content is determined based on a gaze of the user depicted within the second visual content; and switch between the operation of the image capture device in the spherical capture mode and the operation of the image capture device in the non-spherical capture mode.

2. The system of claim 1, wherein the operation of the image capture device in the non-spherical capture mode further includes combination of the extent of the first visual content and an extent of the second visual content within the non-spherical visual content, the extent of the first visual content and the extent of the second visual content being time-synchronized based on operation of the first image sensor and the second image sensor by the image capture device, the extent of the second visual content providing a selfie-view of the user.

3. The system of claim 2, wherein the extent of the first visual content and the extent of the second visual content are spatially arranged within the non-spherical visual content for simultaneous presentation.

4. The system of claim 2, wherein the extent of the first visual content and the extent of the second visual content are temporally arranged within the non-spherical visual content for sequential presentation.

5. The system of claim 4, wherein the extent of the first visual content and the extent of the second visual content are temporally arranged for sequential presentation based on audio associated with the second visual content indicating a depicting of interest occurring within the first visual content.

6. A method for operating an image capture device, the image capture device including a first image sensor configured to generate a first output signal conveying first visual information based on light that becomes incident thereon via a front-facing optical element having a first field of view, the first visual information defining first visual content, a second image sensor configured to generate a second output signal conveying second visual information based on light that becomes incident thereon via a back-facing optical element having a second field of view, the second visual information defining second visual content, the second field of view including a user of the image capture device when the image capture device is held by the user such that the second visual content includes depiction of the user, the method comprising:

operating the image capture device in a spherical capture mode, wherein an operation of the image capture device in the spherical capture mode includes generation of spherical visual content based on stitching of the first visual content and the second visual content;

operating the image capture device in a non-spherical capture mode, wherein an operation of the image capture device in the non-spherical capture mode includes generation of non-spherical visual content that includes an extent of the first visual content, wherein the extent of the first visual content included within the non-spherical visual content is determined based on a gaze of the user depicted within the second visual content; and switching between the operation of the image capture device in the spherical capture mode and the operation of the image capture device in the non-spherical capture mode.

7. The method of claim 6, wherein the operation of the image capture device in the non-spherical capture mode further includes combination of the extent of the first visual content and an extent of the second visual content within the non-spherical visual content, the extent of the first visual content and the extent of the second visual content being time-synchronized based on operation of the first image sensor and the second image sensor by the image capture device, the extent of the second visual content providing a selfie-view of the user.

8. The method of claim 7, wherein the extent of the first visual content and the extent of the second visual content are spatially arranged within the non-spherical visual content for simultaneous presentation.

9. The method of claim 7, wherein the extent of the first visual content and the extent of the second visual content are temporally arranged within the non-spherical visual content for sequential presentation.

10. The method of claim 9, wherein the extent of the first visual content and the extent of the second visual content are temporally arranged for sequential presentation based on audio associated with the second visual content indicating a depicting of interest occurring within the first visual content.

11. The system of claim 1, wherein the operation of the image capture device in the non-spherical capture mode further includes processing resource reserved for the second image sensor being utilized to process the first visual content captured by the first image sensor.

12. The system of claim 1, wherein the operation of the image capture device automatically switches from the spherical capture mode to the non-spherical capture mode based on the back-facing optical element being covered, covering of the back-facing optical element determined based on the second visual content being dark.

13. The system of claim 1, wherein the operation of the image capture device automatically switches between the spherical capture mode and the non-spherical capture mode based on similarity between the first visual content and the second visual content.

14. The system of claim 13, wherein the operation of the image capture device automatically switches from the non-spherical capture mode to the spherical capture mode based on the first visual content and the second visual content being similar.

15. The system of claim 13, wherein the operation of the image capture device automatically switches from the spherical capture mode to the non-spherical capture mode based on the first visual content and the second visual content being dissimilar.

16. The method of claim 6, wherein the operation of the image capture device in the non-spherical capture mode further includes processing resource reserved for the second image sensor being utilized to process the first visual content captured by the first image sensor.

17. The method of claim 6, wherein the operation of the image capture device automatically switches from the spherical capture mode to the non-spherical capture mode based on the back-facing optical element being covered, covering of the back-facing optical element determined based on the second visual content being dark.

18. The method of claim 6, wherein the operation of the image capture device automatically switches between the spherical capture mode and the non-spherical capture mode based on similarity between the first visual content and the second visual content.

19. The method of claim 18, wherein the operation of the image capture device automatically switches from the non-spherical capture mode to the spherical capture mode based on the first visual content and the second visual content being similar.

20. The method of claim 18, wherein the operation of the image capture device automatically switches from the spherical capture mode to the non-spherical capture mode based on the first visual content and the second visual content being dissimilar.

* * * * *

UNITED STATES PATENT AND TRADEMARK OFFICE
CERTIFICATE OF CORRECTION

| | |
|---|---|
| PATENT NO. | : 10,917,565 B1 |
| APPLICATION NO. | : 16/296610 |
| DATED | : February 9, 2021 |
| INVENTOR(S) | : Nicholas Ryan Gilmour et al. |

It is certified that error appears in the above-identified patent and that said Letters Patent is hereby corrected as shown below:

In the Claims

In Claim 2, Column 27, Line 47, please delete "system" and insert --image capture device--, therefor.

In Claim 3, Column 27, Line 57, please delete "system" and insert --image capture device--, therefor.

In Claim 4, Column 27, Line 61, please delete "system" and insert --image capture device--, therefor.

In Claim 5, Column 27, Line 65, please delete "system" and insert --image capture device--, therefor.

In Claim 11, Column 28, Line 59, please delete "system" and insert --image capture device--, therefor.

In Claim 12, Column 28, Line 64, please delete "system" and insert --image capture device--, therefor.

In Claim 13, Column 29, Line 3, please delete "system" and insert --image capture device--, therefor.

In Claim 14, Column 29, Line 8, please delete "system" and insert --image capture device--, therefor.

In Claim 15, Column 29, Line 13, please delete "system" and insert --image capture device--, therefor.

Signed and Sealed this
Fifth Day of July, 2022

Katherine Kelly Vidal
*Director of the United States Patent and Trademark Office*